United States Patent
Nozu et al.

(10) Patent No.: US 9,770,982 B2
(45) Date of Patent: Sep. 26, 2017

(54) FOUR-WHEEL DRIVE VEHICLE AND CONTROL DEVICE FOR FOUR-WHEEL DRIVE VEHICLE

(71) Applicant: JTEKT CORPORATION, Osaka-shi (JP)

(72) Inventors: Tomohiro Nozu, Anjo (JP); Masaki Mita, Chiryu (JP); Akira Kodama, Chiryu (JP); Shotaro Niimi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/075,911

(22) Filed: Mar. 21, 2016

(65) Prior Publication Data

US 2016/0280064 A1   Sep. 29, 2016

(30) Foreign Application Priority Data

Mar. 24, 2015   (JP) .................. 2015-060714

(51) Int. Cl.
*B60K 17/34* (2006.01)
*B60K 23/08* (2006.01)
*F16D 48/06* (2006.01)
*B60K 17/02* (2006.01)
*F16H 48/22* (2006.01)

(52) U.S. Cl.
CPC .............. *B60K 17/34* (2013.01); *B60K 23/08* (2013.01); *F16D 48/06* (2013.01); *B60K 17/02* (2013.01); *B60Y 2400/421* (2013.01); *B60Y 2400/424* (2013.01); *F16D 2500/1024* (2013.01); *F16D 2500/1045* (2013.01); *F16D 2500/1066* (2013.01); *F16D 2500/10431* (2013.01); *F16D 2500/10462* (2013.01); *F16D 2500/3067* (2013.01); *F16D 2500/3118* (2013.01); *F16D 2500/5075* (2013.01); *F16D 2500/50607* (2013.01); *F16D 2500/50615* (2013.01); *F16D 2500/50858* (2013.01); *F16D 2500/70406* (2013.01); *F16H 48/22* (2013.01)

(58) Field of Classification Search
None
See application file for complete search history.

(56) References Cited

U.S. PATENT DOCUMENTS

| | | | |
|---|---|---|---|
| 2004/0016585 A1* | 1/2004 | Wakao | F16D 48/06 180/247 |
| 2010/0094519 A1 | 4/2010 | Quehenberger et al. | |
| 2011/0082004 A1* | 4/2011 | Kato | B60K 17/344 475/303 |

FOREIGN PATENT DOCUMENTS

JP   2010-100280   5/2010

* cited by examiner

*Primary Examiner* — Mark Manley
(74) *Attorney, Agent, or Firm* — Oblon, McClelland, Maier & Neustadt, L.L.P.

(57) ABSTRACT

Provided is a control device for a four-wheel drive which can maintain driving stability while restraining noise and vibration. A control device includes: a second control device that, when at least one of front wheel has slipped, engages a dog clutch after rotating a propeller shaft by a rotational force transmitted via first and second friction clutches; and a third control device that, if a predetermined condition is satisfied when the front wheels are not slipping, engages the dog clutch after rotating the propeller shaft by the rotational force transmitted via the first and second friction clutches. The time required to synchronize the dog clutch by the third control device is longer than that required to synchronize the dog clutch by the second control device.

15 Claims, 10 Drawing Sheets

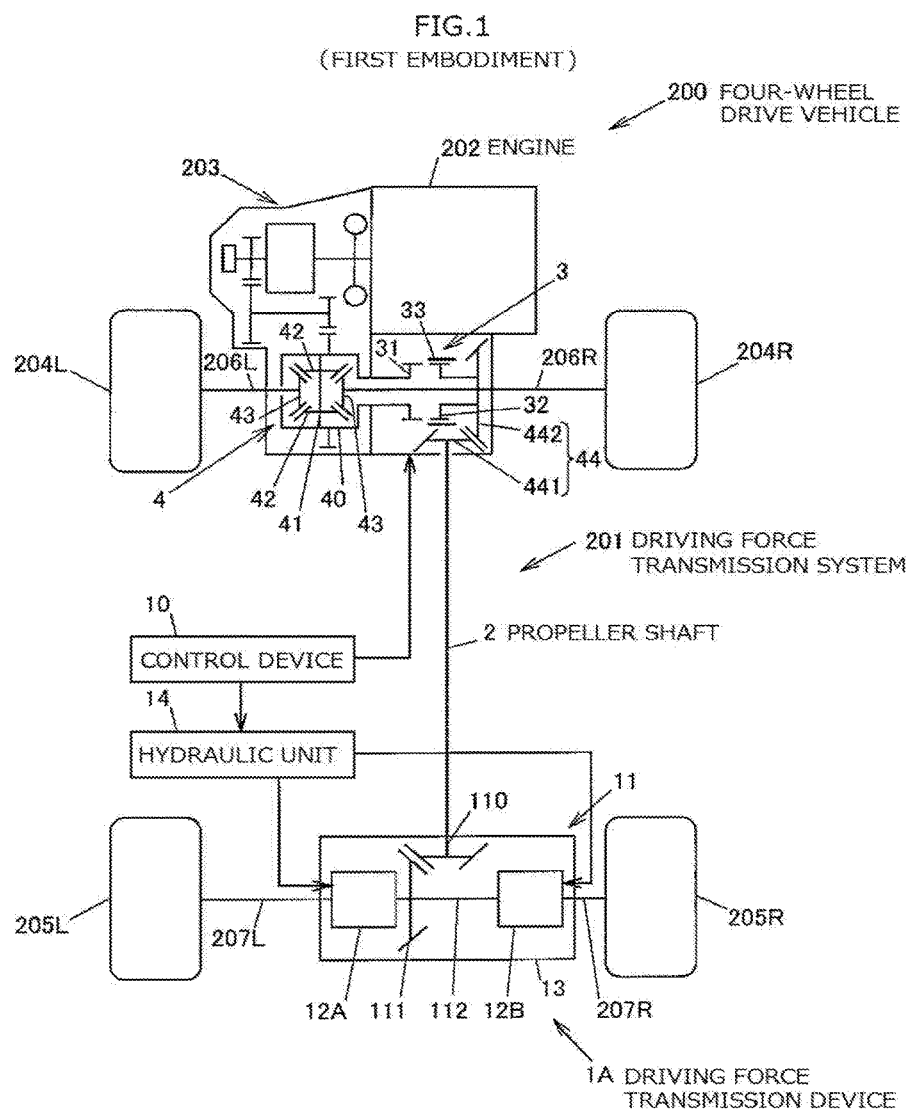

(FIRST EMBODIMENT)

(FIRST EMBODIMENT)

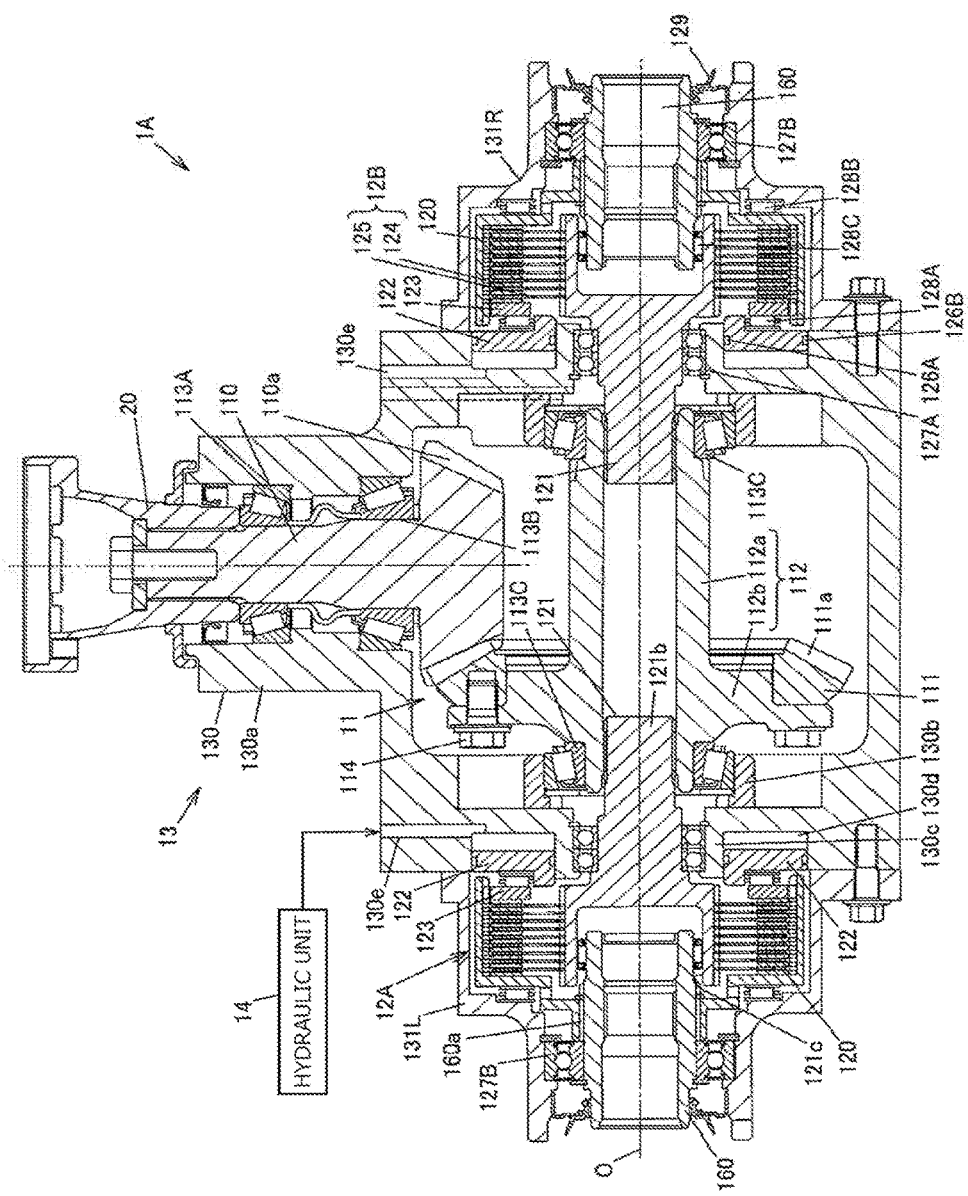

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

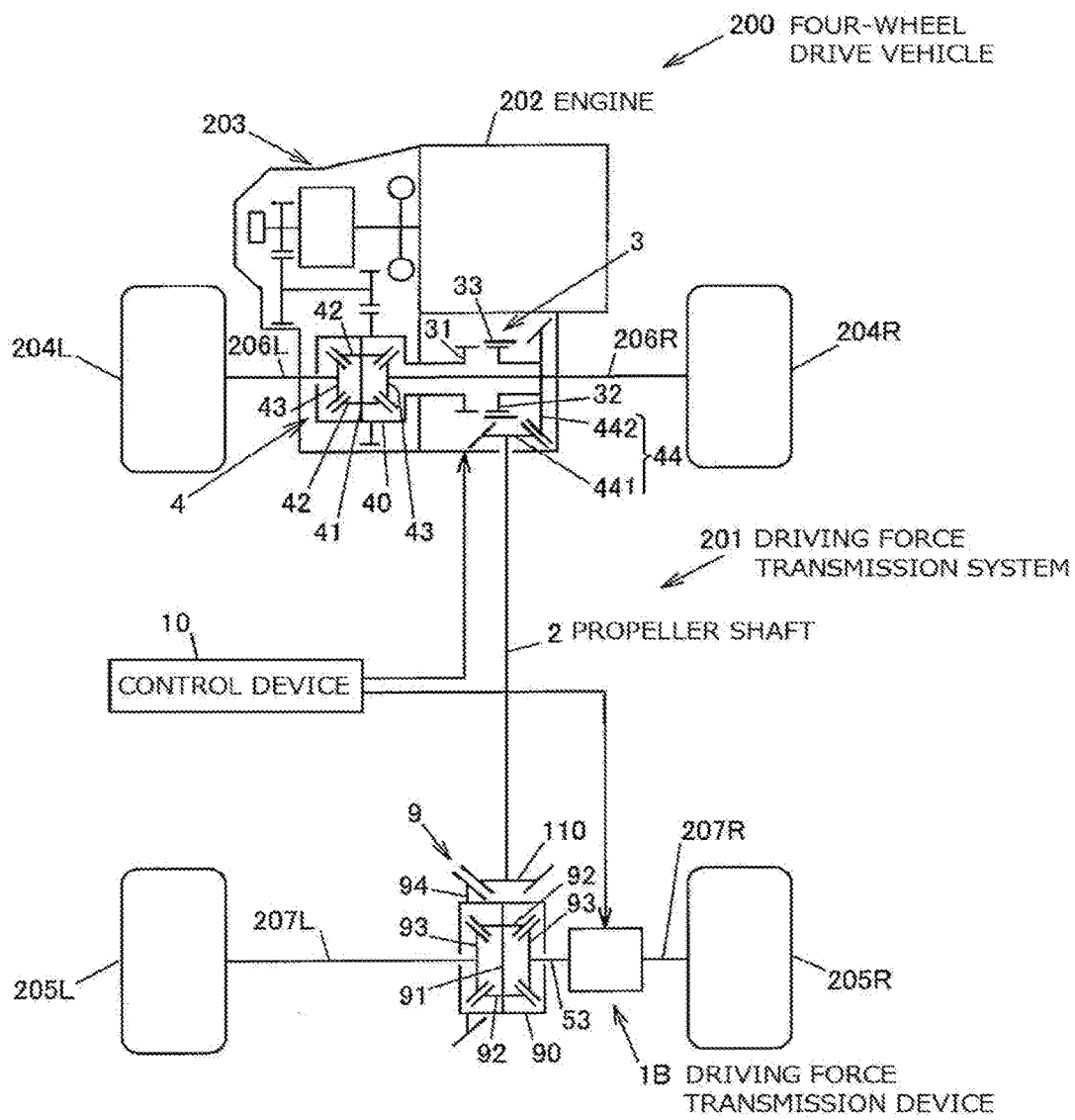

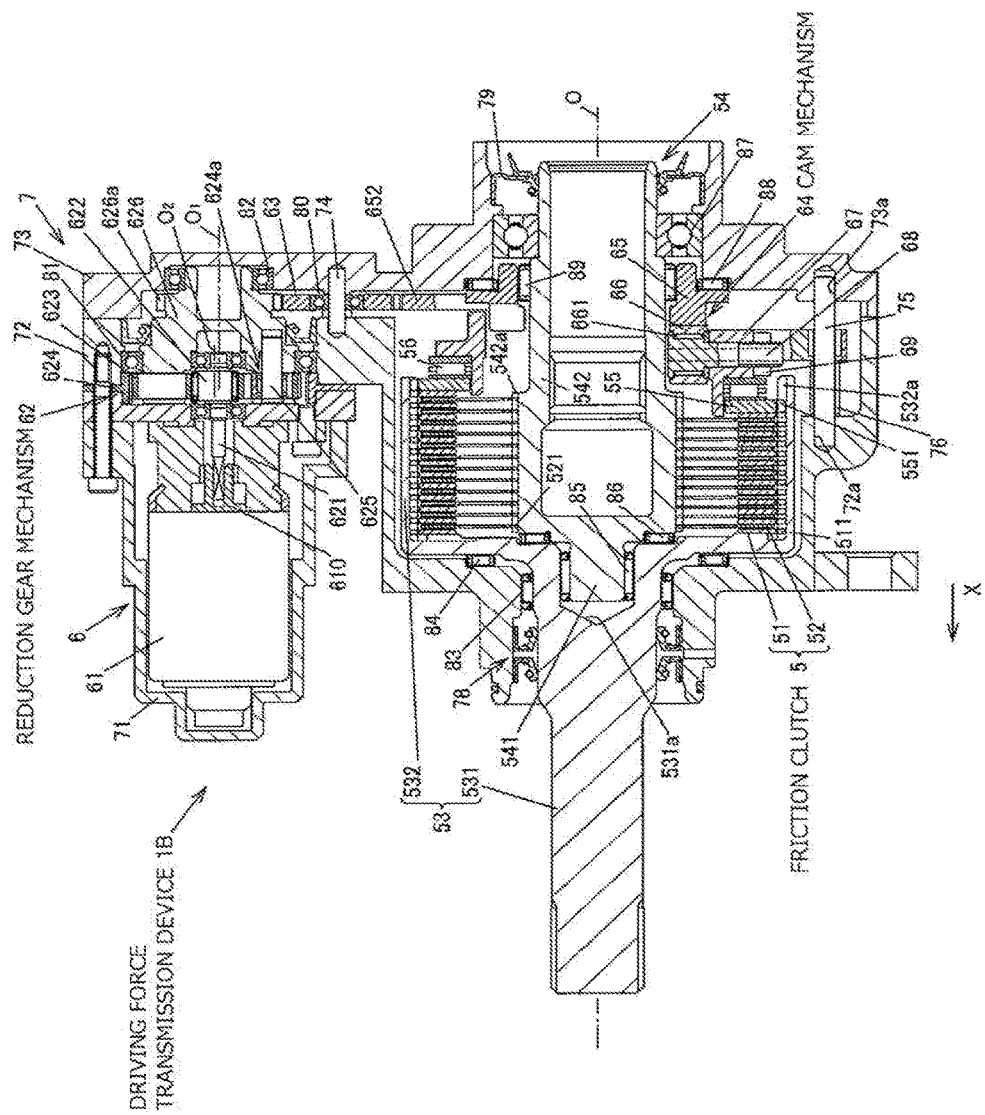

(SECOND EMBODIMENT)

FOUR-WHEEL DRIVE VEHICLE AND CONTROL DEVICE FOR FOUR-WHEEL DRIVE VEHICLE

INCORPORATION BY REFERENCE

The disclosure of Japanese Patent Application No. 2015-060714 filed on Mar. 24, 2015 including the specification, drawings and abstract, is incorporated herein by reference in its entirety.

BACKGROUND OF THE INVENTION

1. Field of the Invention

The present invention relates to four-wheel drive vehicles including a pair of right and left main drive wheels to which a driving force of a driving source is always transmitted, and a pair of right and left auxiliary drive wheels to which the driving force of the driving source is transmitted via a drive shaft that transmits the driving force in the longitudinal direction of the vehicle, and control devices for the four-wheel drive vehicles.

2. Description of the Related Art

Conventionally, there are four-wheel drive vehicles that can switch between a two-wheel drive mode and a four-wheel drive mode. In the two-wheel drive mode, a driving force of a driving source is transmitted only to either the front or rear wheels. In the four-wheel drive mode, the driving force of the driving source is transmitted to the front and rear wheels. This type of four-wheel drive vehicles includes a four-wheel drive vehicle in which clutches are placed on the front and rear sides of a propeller shaft that transmits a driving force in the longitudinal direction of the vehicle and both clutches are disengaged in the two-wheel drive mode to stop rotation of the propeller shaft in order to reduce driving resistance in the two-wheel drive mode and improve fuel economy (see Japanese Patent Application Publication No. 2010-100280 (JP 2010-100280 A).

The four-wheel drive vehicle described in JP 2010-100280 A has a multidisc clutch and a dog clutch. The multidisc clutch is placed on the front side of a propeller shaft (torque transmission section) that transmits a driving force in the longitudinal direction of the vehicle. The dog clutch is placed on the rear side of the propeller shaft. In the two-wheel drive mode, both the multidisc clutch and the dog clutch are deactuated to stop rotation of the propeller shaft. In the four-wheel drive mode, both the multidisc clutch and the dog clutch are actuated to transmit the driving force to auxiliary drive wheels. The multidisc clutch and the dog clutch are operated by an electric motor that is controlled by a control unit.

For example, the four-wheel drive vehicle is switched from the two-wheel drive mode to the four-wheel drive mode in the case where any of the main drive wheels to which the driving force is transmitted slips in the two-wheel drive mode or in the case where the driver performs a switch operation etc. to send a command to switch the four-wheel drive vehicle from the two-wheel drive mode to the four-wheel drive mode.

The dog clutch has a rotary member with recesses and a rotary member with projections and transmits a driving force by engagement between the projections and the recesses. These rotary members cannot be coupled together unless rotation of one of the rotary members is synchronized with rotation of the other. In order to switch the four-wheel drive vehicle from the two-wheel drive mode to the four-wheel drive mode, the multidisc clutch is first actuated to rotate the propeller shaft so that the rotary members of the dog clutch are synchronized in rotation by the rotation of the propeller shaft. The dog clutch is then actuated to couple the rotary members together.

In the multidisc clutch, however, there is a clearance between a plurality of clutch plates when the multidisc clutch is not actuated. A rotational force therefore cannot be applied to the propeller shaft until the clearance is eliminated. When the electric motor for actuating the multidisc clutch is controlled so as to quickly synchronize the rotary members of the dog clutch in rotation, the electric motor rotates at a high speed, producing noise and vibration. Such noise and vibration may bring the driver and an occupant(s) of the four-wheel drive vehicle a feeling of discomfort and insecurity. If the electric motor for actuating the multidisc clutch is rotated at a low speed, it takes a long time to synchronize the rotary members of the dog clutch in rotation even when the four-wheel drive vehicle need be quickly switched from the two-wheel drive mode to the four-wheel drive mode, such as when any of the main drive wheels slips in the two-wheel drive mode. Accordingly, rotating the electric motor at a low speed may reduce driving stability.

SUMMARY OF THE INVENTION

It is one object of the present invention to provide a four-wheel drive vehicle configured to restrain noise and vibration from being recognized by a driver and an occupant(s) and also restraining reduction in driving stability, and a control device for the four-wheel drive vehicle.

One aspect of the present invention relates to a control device that is mounted on a four-wheel drive vehicle. The four-wheel drive vehicle is configured to be switched between a two-wheel drive mode and a four-wheel drive mode, and includes: a pair of right and left main drive wheels to which a driving force of a driving source is transmitted in the two-wheel drive mode and the four-wheel drive mode; a pair of right and left auxiliary drive wheels to which the driving force of the driving source is transmitted in the four-wheel drive mode; a drive shaft that transmits the driving force to the auxiliary drive wheels; a first clutch configured to cut off transmission of the driving force from the driving source to the drive shaft; a second clutch configured to cut off transmission of the driving force from the drive shaft to the auxiliary drive wheels; and an actuator that actuates the first and second clutches. The control device controls the actuator, and one of the first and second clutches is a dog clutch that transmits a rotational force when a projection engages with a recess, and the other clutch is a friction clutch that transmits the rotational force when friction members are caused to frictionally contact each other by a pressing force received from the actuator. The control device includes: a first control device that, when the four-wheel drive vehicle is in the two-wheel drive mode in which the driving force is transmitted only to the pair of right and left main drive wheels, cuts off transmission of the rotational force via the dog clutch and the friction clutch to stop rotation of the drive shaft; a second control device that, when at least one of the pair of right and left main drive wheels slips in the two-wheel drive mode, causes the projection and the recess of the dog clutch to engage with each other after rotating the drive shaft by the rotational force transmitted via the friction clutch to synchronize the dog clutch; and a third control device that, if a predetermined condition is satisfied when the pair of right and left main drive wheels are not slipping in the two-wheel drive mode, causes the projection and the recess of the dog clutch to engage with each other after rotating the drive shaft by the rotational force transmitted via the friction clutch to synchronize the dog clutch, wherein, time required to synchronize the dog clutch by the third control device is set to be longer than that required to synchronize the dog clutch by the second control device.

Another aspect of the present invention relates to a four-wheel drive vehicle including the control device of the above aspect.

The control device for the four-wheel drive vehicle and the four-wheel drive vehicle according to the above aspect can restrain noise and vibration from being recognized by a driver and an occupant(s) and also restrain reduction in driving stability.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a diagram schematically showing the configuration of a four-wheel drive vehicle according to a first embodiment of the present invention;

FIG. 3 is a sectional view showing a specific example of the internal structure of a housing of a driving force transmission device;

FIG. 8 is a diagram schematically showing the configuration of a four-wheel drive vehicle according to a second embodiment;

FIG. 9 is a sectional view showing the configuration of a driving force transmission device.

DETAILED DESCRIPTION OF EMBODIMENTS

Figure 2A:
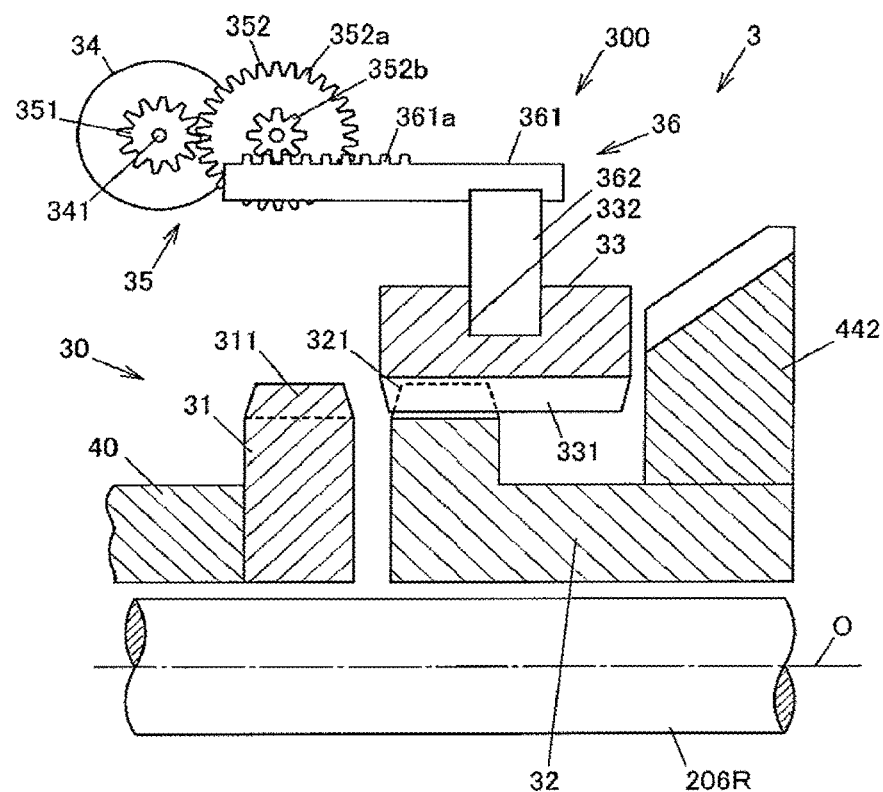
FIG. 2A is a sectional view showing a configuration example of a driving force transmission switching device.

Embodiments of the present invention will be described with reference to the accompanying drawings. FIG. 1 is a diagram schematically showing the configuration of a four-wheel drive vehicle according to a first embodiment of the present invention.

The general configuration of the four-wheel drive vehicle will be described. A four-wheel drive vehicle 200 includes an engine 202 serving as a driving source for generating a driving force for driving the vehicle, a transmission 203, a pair of right and left front wheels 204R, 204L serving as main drive wheels, a pair of right and left rear wheels 205R, 205L serving as auxiliary drive wheels, a driving force transmission system 201, and a control device 10. The driving force transmission system 201 can transmit the driving force of the engine 202 to the front wheels 204R, 204L and the rear wheels 205R, 205L. The control device 10 controls the driving force transmission system 201. In the present embodiment, the letters "L" and "R" in the reference characters mean the left side and the right side with respect to the forward traveling direction of the vehicle.

The four-wheel drive vehicle 200 can be switched between a four-wheel drive mode and a two-wheel drive mode. In the four-wheel drive mode, the driving force of the engine 202 is transmitted to the front wheels 204R, 204L and the rear wheels 205R, 205L. In the two-wheel drive mode, the driving force of the engine 202 is transmitted only to the front wheels 204R, 204L. That is, the driving force of the engine 202 is transmitted to the front wheels 204R, 204L serving as the main drive wheels both in the two-wheel drive mode and the four-wheel drive mode. The driving force of the engine 202 is transmitted to the rear wheels 205R, 205L serving as the auxiliary drive wheels only in the four-wheel drive mode.

The present embodiment is described with respect to the case where the engine as an internal combustion engine is used as the driving source. However, the present invention is not limited to this. A combination of the engine and a high power electric motor such as an interior permanent magnet (IMP) synchronous motor may be used as the driving source, or only the high power electric motor may be used as the driving source.

The driving force transmission system 201 is placed on a driving force transmission path from the transmission 203 to the rear wheels 205R, 205L in the four-wheel drive vehicle 200. The driving force transmission system 201 is mounted on a vehicle body (not shown) of the four-wheel drive vehicle 200.

The driving force transmission system 201 has a driving force transmission device 1A, a propeller shaft 2, a driving force transmission switching device 3, a front differential 4, and gear mechanisms 44, 11. The driving force transmission system 201 can switch the four-wheel drive vehicle 200 from the four-wheel drive mode to the two-wheel drive mode and from the two-wheel drive mode to the four-wheel drive mode.

The front differential 4 has a front differential case 40, a pinion shaft 41, a pair of pinion gears 42, and a pair of side gears 43 and is placed between the transmission 203 and the driving force transmission switching device 3. The pinion shaft 41 rotates together with the front differential case 40. The pair of pinion gears 42 are supported by the pinion shaft 41. The pair of side gears 43 mesh with the pair of pinion gears 42 such that the axes of the pair of side gears 43 extend perpendicularly to those of the pair of pinion gears 42. The first side gear 43 of the pair of side gears 43 is coupled to a front wheel axle shaft 206L, and the second side gear 43 of the pair of side gears 43 is coupled to a front wheel axle shaft 206R.

The engine 202 drives the front wheels 204R, 204L by outputting the driving force to the front wheel axle shafts 206R, 206L via the transmission 203 and the front differential 4. The engine 202 drives the rear wheels 205R, 205L by outputting the driving force to rear wheel axle shafts 207R, 207L via the transmission 203, the driving force transmission switching device 3, the propeller shaft 2, and the driving force transmission device 1A.

The propeller shaft 2 is placed between the driving force transmission device 1A and the driving force transmission switching device 3 and transmits the driving force in the longitudinal direction of the four-wheel drive vehicle 200. In the four-wheel drive mode, the propeller shaft 2 receives the driving force of the engine 202 from the driving force transmission switching device 3 via the front differential case 40 and transmits the driving force toward the rear wheels 205R, 205L. That is, the propeller shaft 2 is one form of the drive shaft of the present invention.

The front wheel-side gear mechanism 44 is placed at the front wheel-side end of the propeller shaft 2. The front wheel-side gear mechanism 44 is formed by a drive pinion 441 and a ring gear 442 which mesh with each other. The drive pinion 441 is coupled to the front end of the propeller shaft 2, and the ring gear 442 meshes with the drive pinion 441 such that the axis of the ring gear 442 extends perpendicularly to that of the drive pinion 441.

Figure 2B:
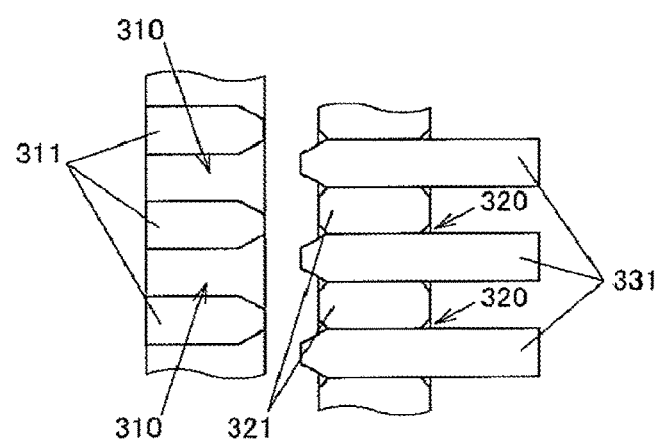
FIG. 2B is an illustration of a configuration example of the driving force transmission switching device, schematically showing a meshing part of the driving force transmission switching device in a disengaged state.

The configuration of the driving force transmission switching device will be described. FIGS. 2A and 2B show a configuration example of the driving force transmission switching device 3. FIG. 2A is a sectional view of the driving force transmission switching device 3, and FIG. 2B is an illustration schematically showing a meshing part of the driving force transmission switching device 3. FIG. 2A shows a half of the driving force transmission switching device 3 which is located above a rotation axis O of the front differential case 40.

The driving force transmission switching device 3 includes a dog clutch 30 and a first actuator 300 that actuates the dog clutch 30. The dog clutch 30 is formed by first to third rotary members 31 to 33 that rotate about the same axis as the front differential case 40. The first actuator 300 includes an electric motor 34, a reduction gear mechanism 35, and a moving mechanism 36. The reduction gear mechanism 35 reduces the speed of rotation output by an output shaft 341 of the electric motor 34. The moving mechanism 36 moves the third rotary member 33 of the dog clutch 30 in the axial direction by torque of the electric motor 34 reduced in speed by the reduction gear mechanism 35. The electric motor 34 is driven by a current that is supplied from the control device 10. The first actuator 300 is controlled by the control device 10.

The first rotary member 31 of the dog clutch 30 is fixed to the axial end of the front differential case 40. The second rotary member 32 is fixed to the ring gear 442 of the gear mechanism 44. The third rotary member 33 is movable relative to the first rotary member 31 and the second rotary member 32 in the axial direction.

The first rotary member 31 has an annular shape so that the right front wheel axle shaft 206R is inserted therethrough. The first rotary member 31 has a plurality of spline teeth 311 formed in its outer peripheral surface so as to extend parallel to the rotation axis O of the front differential case 40. A recess 310 is formed between each pair of spline teeth 311 adjacent to each other in the circumferential direction.

The second rotary member 32 has a tubular shape so that the right front wheel axle shaft 206R is inserted therethrough. The second rotary member 32 is rotatable relative to the first rotary member 31 about the same axis as the first rotary member 31. The second rotary member 32 has a plurality of spline teeth 321 formed in its outer peripheral surface so as to extend parallel to the rotation axis O of the front differential case 40. A recess 320 is formed between each pair of spline teeth 321 adjacent to each other in the circumferential direction.

The third rotary member 33 is a sleeve-like coupling member placed around the first rotary member 31 and the second rotary member 32. The third rotary member 33 has a plurality of spline teeth 331 formed in its inner peripheral surface. The plurality of spline teeth 331 can engage with the plurality of spline teeth 311 of the first rotary member 31 and the plurality of spline teeth 321 of the second rotary member 32.

In the present embodiment, the third rotary member 33 always meshes with the second rotary member 32 and is movable relative to the second rotary member 32 in the axial direction. More specifically, the plurality of spline teeth 331 of the third rotary member 33 engage with the recesses 320 of the second rotary member 32, and the third rotary member 33 is movable relative to the second rotary member 32 in the axial direction with the spline teeth 331 being engaged with the recesses 320.

When the third rotary member 33 is moved to the first rotary member 31 by the moving mechanism 36, the plurality of spline teeth 331 as projections of the third rotary member 33 engage with the recesses 310 of the first rotary member 31, so that the third rotary member 33 is coupled to the first rotary member 31 so as not to be rotatable relative to the first rotary member 31. The first rotary member 31 and the second rotary member 32 are thus coupled together via the third rotary member 33 so as not to be rotatable relative to each other. In this state, the driving force of the engine 202 can be transmitted from the first rotary member 31 to the second rotary member 32. In other words, the dog clutch 30 transmits a rotational force by engagement of the spline teeth 331 of the third rotary member 33 with the recesses 310, 320 of the first and second rotary members 31, 32.

When the third rotary member 33 is separated from the first rotary member 31, the plurality of spline teeth 331 of the third rotary member 33 are disengaged from the recesses 310 of the first rotary member 31, so that the first rotary member 31 and the second rotary member 32 can rotate relative to each other. Transmission of the driving force from the first rotary member 31 to the second rotary member 32 is thus cut off. That is, the dog clutch 30 is one form of the first clutch of the present invention which can cut off transmission of the driving force from the engine 202 to the propeller shaft 2.

The reduction gear mechanism 35 has a pinion gear 351 and a reduction gear 352. The pinion gear 351 rotates together with the output shaft 341 of the electric motor 34. The reduction gear 352 has a large diameter gear portion 352a that meshes with the pinion gear 351, and a small diameter gear portion 352b that rotates together with the large diameter gear portion 352a. The moving mechanism 36 has a linear motion shaft 361 and a shift fork 362. The linear motion shaft 361 has rack teeth 361a that mesh with the small diameter gear portion 352b of the reduction gear 352. The shift fork 362 is fixed to the linear motion shaft 361. The third rotary member 33 has an annular groove 332 formed in its outer peripheral surface so that the shift fork 362 can slidably fit in the annular groove 332.

When the output shaft 341 of the electric motor 34 rotates, the rotation output by the output shaft 341 is reduced in speed by the reduction gear mechanism 35, and the linear motion shaft 361 moves parallel to the rotation axis O of the front differential case 40. With this movement of the linear motion shaft 361, the third rotary member 33 moves between a coupled position where the third rotary member 33 meshes with the first and second rotary members 31, 32 and a decoupled position where the third rotary member 33 meshes with the second rotary member 32 but does not mesh with the first rotary member 31.

The configuration of the driving force transmission device will be described. As shown in FIG. 1, the driving force transmission device 1A has the rear wheel-side gear mechanism 11, first and second friction clutches 12A, 12B, a housing 13, and a hydraulic unit 14. The driving force is transmitted from the propeller shaft 2 to the rear wheel-side gear mechanism 11. The first and second friction clutches 12A, 12B adjust the driving force transmitted from the gear mechanism 11 and transmits the adjusted driving force to the axle shafts 207L, 207R. The housing 13 accommodates the first and second friction clutches 12A, 12B and the gear mechanism 11. The hydraulic unit 14 supplies hydraulic oil to the first and second friction clutches 12A, 12B. The first and second friction clutches 12A, 12B are one form of the second clutch of the present invention which can cut off transmission of the driving force from the propeller shaft 2 to the rear wheels 205L, 205R.

The gear mechanism 11 includes a pinion gear 110, a ring gear 111, and a center shaft 112. The pinion gear 110 and the ring gear 111 mesh with each other such that their axes extend perpendicularly to each other. The center shaft 112 rotates together with the ring gear 111. The rotation axis of the center shaft 112 is parallel to the lateral direction of the vehicle. The center shaft 12 receives the rotational force of the propeller shaft 2 via the ring gear 111 and rotates according to the received rotational force. The first friction clutch 12A is placed between the center shaft 112 and the rear wheel axle shaft 207L, and the second friction clutch 12B is placed between the center shaft 112 and the rear wheel axle shaft 207R.

When the four wheel-drive vehicle 200 configured as described above is in the two-wheel drive mode, the driving force transmission switching device 3 cuts off transmission of the driving force from the engine 202 to the propeller shaft 2, and the driving force transmission device 1A cuts off transmission of the rotational force from the rear wheels 205R, 205L to the propeller shaft 2. Rotation of the propeller shaft 2 therefore stops even if the four-wheel drive vehicle 200 is traveling. This reduces stirring resistance of lubricating oil etc. in the front wheel-side gear mechanism 44 and the rear wheel-side gear mechanism 11.

When the four-wheel drive vehicle 200 is switched from the two-wheel drive mode to the four-wheel drive mode, the driving force transmission switching device 3 is actuated (the state where torque can be transmitted) after the rotational force of the rear wheels 205R, 205L is transmitted to the propeller shaft 2 via the driving force transmission device 1A to rotate the propeller shaft 2 and synchronization of the dog clutch 30 is completed. The four-wheel drive vehicle 200 is thus switched to the four-wheel drive mode. As used herein, "synchronization of the dog clutch 30" means that the rotational speed of the first rotary member 31 becomes substantially the same as that of the second rotary member 32.

Figure 4:
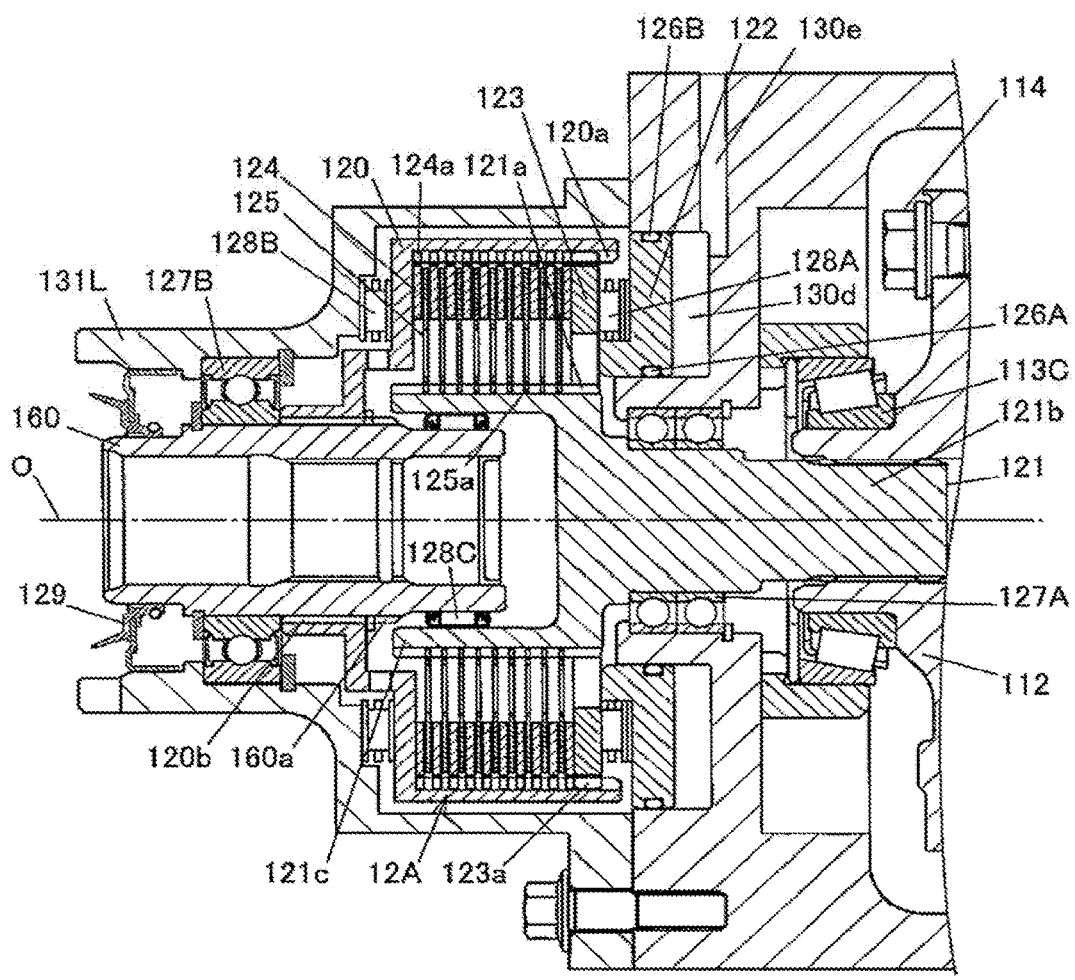
FIG. 4 is a sectional view showing a main part of a first friction clutch and the configuration around the first friction clutch.

FIG. 3 is a sectional view of a specific example of the structure of the driving force transmission device 1A. FIG. 4 is a sectional view of a main part of the first friction clutch 12A and the configuration around the first friction clutch 12A.

As shown in FIG. 3, the driving force transmission device 1A has the gear mechanism 11, the first and second friction clutches 12A, 12B, and the housing 13. The pinion gear 110 of the gear mechanism 11 is coupled to the propeller shaft 2 by an intermediate shaft 20. The driving force transmission device 1A further has a pair of right and left clutch housings 120, a pair of right and left inner shafts 121, and a pair of right and left coupling shafts 160. The right and left clutch housings 120 accommodate the second friction clutch 12B and the first friction clutch 12A, respectively. Each of the inner shafts 121 is supported so as to be rotatable relative to a corresponding one of the clutch housings 120 about the same axis as the clutch housing 120. Each of the coupling shafts 160 couples a corresponding one of the clutch housings 120 to a corresponding one of the rear wheel axle shafts 207R, 207L so that the clutch housing 120 is not rotatable relative to the rear wheel axle shaft 207R, 207L.

The housing 13 includes a center housing member 130 and side housing members 131R, 131L. The center housing member 130 accommodates the pinion gear 110, the ring gear 111, and the center shaft 112 of the gear mechanism 11. The side housing member 131L accommodates the first friction clutch 12A, and the side housing member 131R accommodates the second friction clutch 12B. The center housing member 130 is placed between the side housing member 131L located on the left side in the lateral direction of the vehicle and the side housing member 131R located on the right side in the lateral direction of the vehicle. The side housing members 131R, 131L are fixed to the center housing member 130 by bolting. Lubricating oil, not shown, is enclosed in the housing 13. The lubricating oil lubricates meshing parts of the gears of the gear mechanism 11 and frictionally sliding parts of the first and second friction clutches 12A, 12B.

The center housing member 130 includes a first holding portion 130a, a second holding portion 130b, a third holding portion 130c, and cylinder chambers 130d. The first holding portion 130a rotatably holds the pinion gear 110 of the gear mechanism 11 via tapered roller bearings 113A, 113B. The second holding portion 130b rotatably holds the center shaft 112 of the gear mechanism 11 via a tapered roller bearing 113C. The third holding portion 130c rotatably holds the pair of right and left inner shafts 121 via ball bearings 127A. Each of the cylinder chambers 130d accommodates a piston 122, described below, so that the piston 122 can advance and withdraw therein. The cylinder chambers 130d are provided in both ends of the center housing member 130 in the lateral direction of the vehicle and are open toward the side housing members 131R, 131L, respectively.

The center shaft 112 has a cylindrical portion 112a and a flange portion 112b. The cylindrical portion 112a extends along the rotation axis O, and the flange portion 112b is formed at an end of the cylindrical portion 112a so as to project outward in the radial direction. The cylindrical portion 112a and the flange portion 112b are formed as a single-piece member. The ring gear 111 has a plurality of meshing teeth 111a that mesh with a gear portion 110a of the pinion gear 110. The ring gear 111 is fixed to the flange portion 112b of the center shaft 112 by bolts 114.

Each of the first and second friction clutches 12A, 12B has a plurality of outer clutch plates 124 and a plurality of inner clutch plates 125. The plurality of outer clutch plates 124 engage with the clutch housing 120 so as to be movable relative to the clutch housing 120 in the axial direction and so as not to be rotatable relative to the clutch housing 120. The plurality of inner clutch plates 125 engage with the inner shaft 121 so as to be movable relative to the inner shaft 121 in the axial direction and so as not to be rotatable relative to the inner shaft 121. The plurality of outer clutch plates 124 and the plurality of inner clutch plates 125 are alternately arranged in a direction parallel to the rotation axis O of the center shaft 112 and are pressed by the piston 122. The outer clutch plates 124 and the inner clutch plates 125 are one form of the friction members of the present invention.

Each of the pistons 122 can be moved to advance and withdraw in a corresponding one of the cylinder chambers 130d of the center housing member 130 by hydraulic oil that is supplied from the hydraulic unit 14. The center housing member 130 has supply flow paths 130e through which the hydraulic oil supplied form the hydraulic unit 14 is supplied to the cylinder chambers 130d. Sealing members 126A, 126B are placed on the inner and outer peripheral surfaces of each piston 122.

When the pistons 122 are subjected to the pressure of the hydraulic oil, the first and second friction clutches 12A, 12B receive the moving force of the pistons 122 via a needle roller bearing 128A and a pressing member 123. The plurality of outer clutch plates 124 and the plurality of inner clutch plates 125 thus frictionally contact each other, whereby the rotational force is transmitted between the inner shaft 121 and the clutch housing 120. The driving force of the engine 202 is thus transmitted to the rear wheels 205R, 205L via the first and second friction clutches 12B, 12A.

When the pistons 122 are not subjected to the pressure of the hydraulic oil, the plurality of outer clutch plates 124 and the plurality of inner clutch plates 125 in the first and second friction clutches 12A, 12B are rotatable relative to each other. The first and second friction clutches 12A, 12B can thus cut off transmission of the driving force from the engine 202 to the rear wheels 205L, 205R.

As shown in FIG. 4, each of the plurality of outer clutch plates 124 has a spline projection 124a in its outer periphery. The spline projections 124a engage with a straight spline fitting portion 120a formed in the inner peripheral surface of the clutch housing 120. Each of the plurality of inner clutch plates 125 has a spline projection 125a in its inner periphery. The spline projections 125a engage with a straight spline fitting portion 121a formed in the outer peripheral surface of the inner shaft 121.

Each pressing member 123 is formed by an annular plate member and has a spline projection 123a in its outer periphery. The spline projection 123a engages with the straight spline fitting portion 120a of the clutch housing 120. As the spline projection 123a engages with the straight spline fitting portion 120a, the pressing member 123 is coupled to the clutch housing 120 so as to be movable relative to the clutch housing 120 in the axial direction and so as not to be rotatable relative to the clutch housing 120. The pressing member 123 faces the piston 122 with the needle roller bearing 128A interposed therebetween.

Each clutch housing 120 has a spline fitting portion 120b. The spline fitting portion 120b is spline-fitted on a spline fitting portion 160a formed in the outer peripheral surface of the coupling shaft 160. The clutch housing 120 is thus coupled to the coupling shaft 160 so as not to be rotatable relative to the coupling shaft 160. Each clutch housing 120 is rotatably supported by a corresponding one of the side housing members 131R, 131L via a needle roller bearing 128B.

Each inner shaft 121 has a columnar shaft portion 121b and a cylindrical portion 121c that accommodates one end of the coupling shaft 160. The tip end of the shaft portion 121b is coupled to the center shaft 112 by spline fitting so that the shaft portion 121b is not rotatable relative to the center shaft 112. A needle roller bearing 128C is placed between the inner peripheral surface of the cylindrical portion 121c and the outer peripheral surface of the coupling shaft 160. A ball bearing 127B and a sealing member 129 are placed between the inner surface of the opening in the end of each side housing member 131R, 131L in the lateral direction of the vehicle and the outer peripheral surface of the coupling shaft 160.

Figure 5:
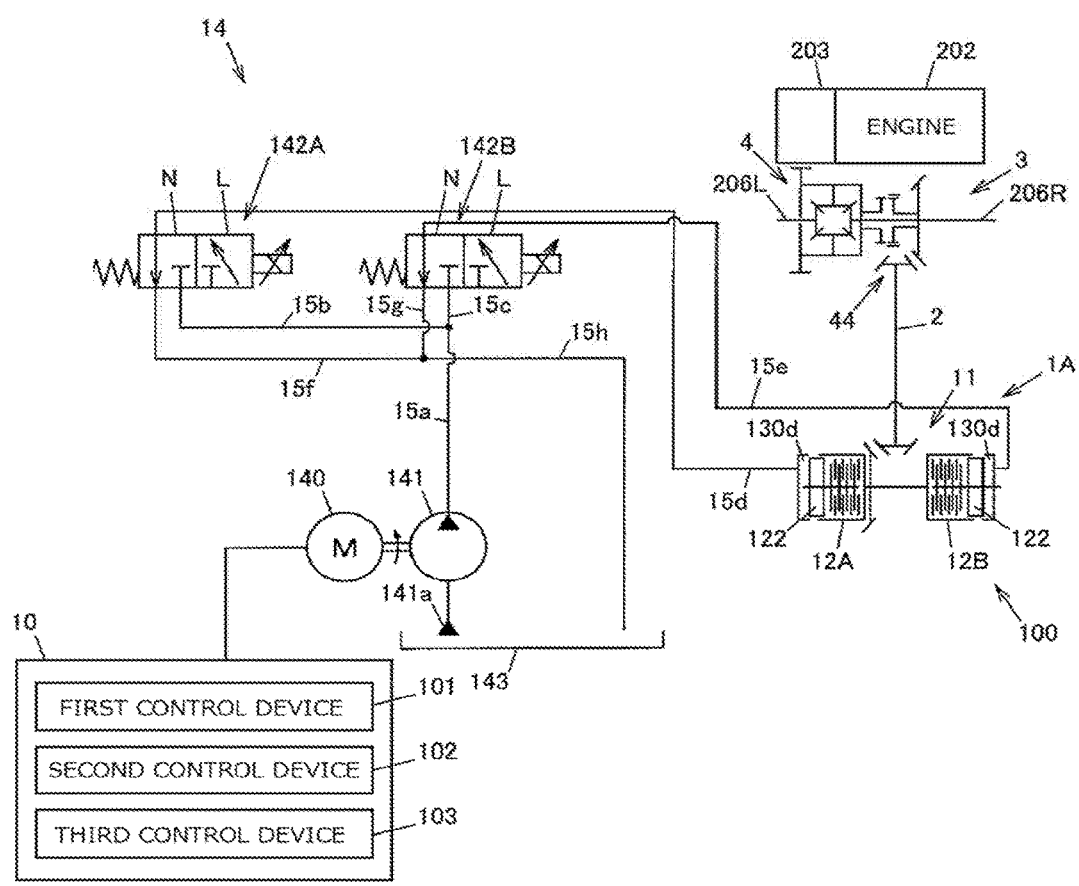
FIG. 5 is a hydraulic circuit diagram schematically showing a configuration example of a hydraulic circuit including a hydraulic unit.

The configuration of the hydraulic unit will be described. FIG. 5 is a diagram schematically showing the control device 10 and a configuration example of a hydraulic circuit including the hydraulic unit 14 in the four-wheel drive vehicle 200. The hydraulic unit 14 includes an electric motor 140, a hydraulic pump 141, a first control valve 142A, and a second control valve 142B. A motor current is supplied from the control device 10 to the electric motor 140. The hydraulic pump 141 is driven by the electric motor 140. The first and second control valves 142A, 142B switch a flow path of hydraulic oil according to a current supplied from the control device 10. The first control valve 142A is placed between the hydraulic pump 141 and the first friction clutch 12A. The second control valve 142B is placed between the hydraulic pump 141 and the second friction clutch 12B.

The hydraulic unit 14 has passages 15a, 15b, 15c, 15d, 15e. The hydraulic pump 141 sucks hydraulic oil stored in an oil pan 143 through a suction port 141a and pressure-feeds the sucked hydraulic oil through the passage 15a. The passage 15a divides into the passage 15b leading to the first control valve 142A and the passage 15c leading to the second control valve 142B. The passage 15d extends from the first control valve 142A to the cylinder chamber 130d corresponding to the first friction clutch 12A. The passage 15e extends from the second control valve 142B to the cylinder chamber 130d corresponding to the second friction clutch 12B.

The hydraulic unit 14 further has passages 15f, 15g, 15h. The passages 15f, 15g extend from the first and second control valves 142A, 142B back toward the oil pan 143, respectively. The passages 15f, 15g merge into the passage 15h leading to the oil pan 143.

In the present embodiment, the first control valve 142A and the second control valve 142B can be switched between two modes according to the amount of current that is supplied from the control device 10. The first mode is a supply mode L in which hydraulic oil can be supplied from the hydraulic pump 141 to the first and second friction clutches 12A, 12B. The second mode is a discharge mode N in which hydraulic oil can be discharged from the first and second friction clutches 12A, 12B to the oil pan 143. In FIG. 5, the first control valve 142A and the second control valve 142B are in the discharge mode N.

The hydraulic unit 14 and the pistons 122 function as a second actuator 100 that actuates the first and second friction clutches 12A, 12B. The hydraulic pump 141, the first and second control valves 142A, 142B, and the pistons 122 function as a conversion mechanism that converts torque of the electric motor 140 to a pressing force that causes the plurality of outer clutch plates 124 and the plurality of inner clutch plates 125 to frictionally contact each other.

A control process that is performed by the control device will be described. The control device 10 controls the second actuator 100 by supplying a current to the electric motor 140, the first control valve 142A, and the second control valve 142B. That is, the control device 10 can cause the plurality of outer clutch plates 124 and the plurality of inner clutch plates 125 of the first and second friction clutches 12A, 12B to frictionally contact each other by switching the first control valve 142A and the second control valve 142B to the supply mode L and supplying a motor current to the electric motor 140.

The pressing force that causes the plurality of outer clutch plates 124 and the plurality of inner clutch plates 125 to frictionally contact each other varies according to the amount of current that is supplied to the electric motor 140. The control device 10 can adjust the amount of current to be supplied to the electric motor 140 in a stepless manner or in a plurality of steps. The larger the amount of current that is supplied to the electric motor 140 is, the more firmly the plurality of outer clutch plates 124 and the plurality of inner clutch plates 125 are pressed, and the larger the rotational force that can be transmitted is.

The control device 10 can control the first actuator 300 to switch the dog clutch 30 between the actuated state (engaged state) and the deactuated state (disengaged state). The control device 10 can control the second actuator 100 to switch the first and second friction clutches 12A, 12B to the deactuated state and to change the rotational force to be transmitted when the first and second friction clutches 12A, 12B are in the actuated state.

When the four-wheel drive vehicle 200 is in the four-wheel drive mode, the dog clutch 30 and the first and second friction clutches 12A, 12B are in the actuated state, and the driving force of the engine 202 is transmitted to the rear wheels 205R, 205L via the propeller shaft 2. When the four-wheel drive vehicle 200 is in the two-wheel drive mode in which the driving force of the engine 202 is transmitted only to the front wheels 204R, 204L, the dog clutch 30 and the first and second friction clutches 12A, 12B are in the deactuated state, and rotation of the propeller shaft 2 stops.

If at least one of the front wheels 204R, 204L slips when the four-wheel drive vehicle 200 is traveling in the two-wheel drive mode, the control device 10 immediately actuates the dog clutch 30 and the first and second friction clutches 12A, 12B to switch the four-wheel drive vehicle 200 to the four-wheel drive mode. For example, the control device 10 can obtain information such as the rotational speeds of the front wheels 204R, 204L and the rear wheels 205R, 205L, the steering angle, etc. via an in-vehicle communication network such as a controller area network (CAN). The control device 10 can detect a slip based on the obtained information.

For example, the control device 10 switches the four-wheel drive vehicle 200 to the four-wheel drive mode if the four-wheel drive mode is selected by the driver by a switch operation. The control device 10 also switches the four-wheel drive vehicle 200 to the four-wheel drive mode if it is determined based on the information obtained via the in-vehicle communication network that at least one of the front wheels 204R, 204L is likely to slip when the four-wheel drive vehicle 200 is in the two-wheel drive mode.

When switching the four-wheel drive vehicle 200 from the two-wheel drive mode to the four-wheel drive mode, the control device 10 first controls the second actuator 100 to actuate the first and second friction clutches 12A, 12B so that the propeller shaft 2 is rotated by the rotational force transmitted from the rear wheels 205L, 205R via the first and second friction clutches 12A, 12B and the rear wheel-side gear mechanism 11. After synchronization of the dog clutch 30 is completed, the control device 10 controls the first actuator 300 to actuate the dog clutch 30.

Specifically, the control device 10 includes a first control device 101, a second control device 102, and a third control device 103. When the four-wheel drive vehicle 200 is in the two-wheel drive mode in which the driving force is transmitted only to the front wheels 204R, 204L, the first control device 101 cuts off transmission of the rotational force by the dog clutch 30 and the first and second friction clutches 12A, 12B to stop rotation of the propeller shaft 2. If at least one of the front wheels 204R, 204L slips in the two-wheel drive mode, the second control device 102 rotates the propeller shaft 2 by the rotational force transmitted via the first and second friction clutches 12A, 12B to synchronize the dog clutch 30, and then causes the spline teeth 331 of the third rotary member 33 to engage with the recesses 310 of the first rotary member 31 of the dog clutch 30. If a predetermined condition is satisfied when the front wheels 204R, 204L are not slipping in the two-wheel drive mode, the third control device 103 rotates the propeller shaft 2 by the rotational force transmitted via the first and second friction clutches 12A, 12B to synchronize the dog clutch 30, and then causes the spline teeth 331 of the third rotary member 33 to engage with the recesses 310 of the first rotary member 31 of the dog clutch 30.

For example, the first to third control devices 101 to 103 are embodied by executing a program stored in a storage element such as a read only memory (ROM) by a central processing unit (CPU) of the control device 10. For example, the predetermined condition in the third control device 103 is that the driver has operated to switch the four-wheel drive vehicle 200 from the two-wheel drive mode to the four-wheel drive mode, or that it has been determined that at least one of the front wheels 204R, 204L is likely to slip. For example, the third control device 103 of the control device 10 determines that at least one of the front wheels 204R, 204L is likely to slip if it is determined that the outside temperature is low (e.g., 0° or lower) or it is determined based on image analysis of the road surface by an imaging device that the four-wheel drive vehicle 200 is traveling on a low μ road (a road with a low friction coefficient).

Alternatively, the predetermined condition may be that the driver has operated to select a sport drive mode or that the four-wheel drive vehicle 200 is traveling on a slope. In the case where the sport drive mode is selected, the four-wheel drive vehicle 200 is switched to the four-wheel drive mode in advance to ensure driving stability because the gear ratio in the transmission 203 increases and the four-wheel drive vehicle 200 is likely to be rapidly accelerated or rapidly decelerated. In the case where the four-wheel drive vehicle 200 is traveling on a slope, the four-wheel drive vehicle 200 is switched to the four-wheel drive mode in advance to ensure driving stability because a slip tends to occur.

In the present embodiment, the time required to synchronize the dog clutch 30 by the third control device 103 is longer than that required to synchronize the dog clutch 30 by the second control device 102. For example, in the case where the four-wheel drive vehicle 200 is traveling straight at a constant vehicle speed, the time required to synchronize the dog clutch 30 in order to switch the four-wheel drive vehicle 200 from the two-wheel drive mode to the four-wheel drive mode when the predetermined condition has been satisfied is longer than that required to synchronize the dog clutch 30 in order to switch the four-wheel drive vehicle 200 from the two-wheel drive mode to the four-wheel drive mode when at least one of the front wheels 204R, 204L has slipped.

This is in order to restrain noise and vibration produced by rotation of the electric motor 140 of the second actuator 100 from being recognized by the driver and an occupant(s) of the four-wheel drive vehicle 200 and to restrain reduction in driving stability at the time the four-wheel drive vehicle 200 is traveling on a low μ road. If the rotational speed and the rotational torque of the electric motor 140 are increased to quickly synchronize the dog clutch 30 when switching the four-wheel drive vehicle 200 to the four-wheel drive mode, noise and vibration produced by rotation of the electric motor 140 are recognized by the driver and the occupant(s), which may bring the driver and the occupant(s) a feeling of discomfort and insecurity. Accordingly, if the level of urgency is relatively low, the dog clutch 30 is slowly synchronized. If at least one of the front wheels 204R, 204L has slipped, the dog clutch 30 is quickly synchronized to complete switching of the four-wheel drive vehicle 200 to the four-wheel drive mode in order to ensure driving stability.

The electric motor 140 rotates at the highest speed when eliminating clearances between the plurality of outer clutch plates 124 and the plurality of inner clutch plates 125 in the first and second friction clutches 12A, 12B. The movement of the plurality of outer clutch plates 124 and the plurality of inner clutch plates 125 at this time will be specifically described with reference to FIGS. 6A and 6B.

Figure 6A:
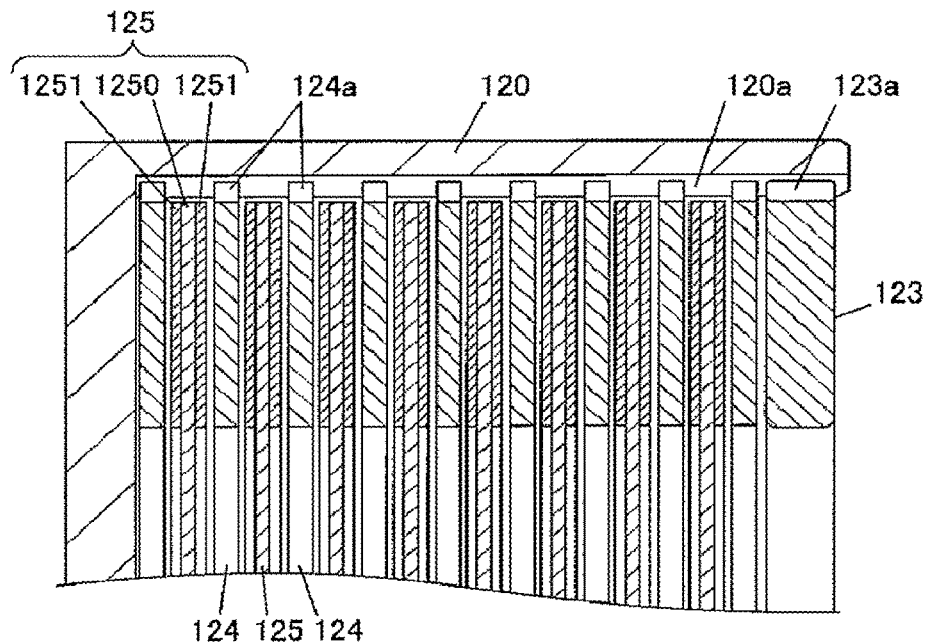
FIG. 6A is a partial enlarged sectional view of a plurality of outer clutch plates and a plurality of inner clutch plates accommodated in a clutch housing when a friction clutch is in a deactuated state.
Figure 6B:
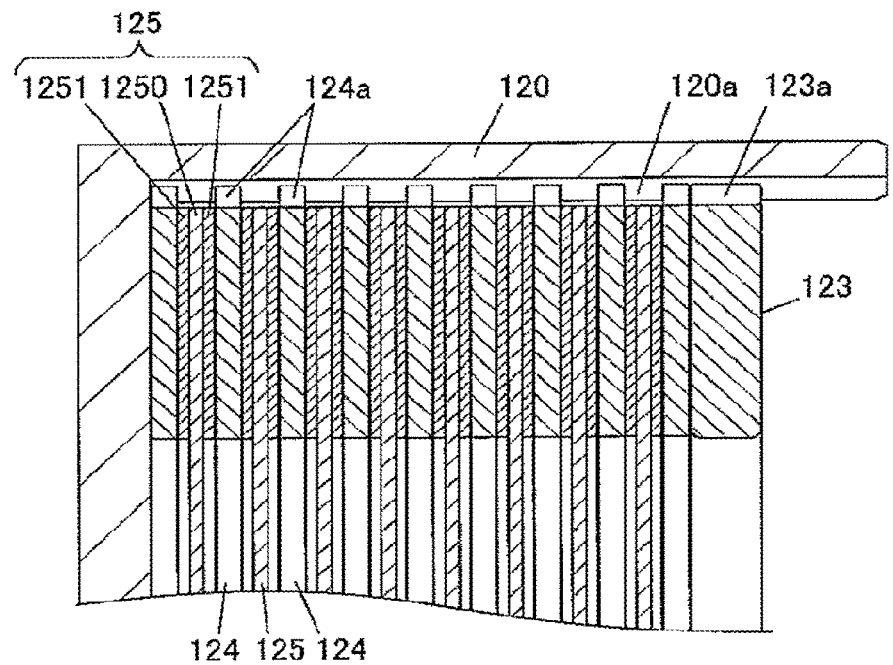
FIG. 6B is a partial enlarged sectional view of the plurality of outer clutch plates and the plurality of inner clutch plates accommodated in the clutch housing when the friction clutch is in an actuated state.

FIGS. 6A and 6B are partial enlarged sectional views of the plurality of outer clutch plates 124 and the plurality of inner clutch plates 125 accommodated in the clutch housing 120. FIG. 6A shows the deactuated state of the friction clutch and FIG. 6B shows the actuated state of the friction clutch. In the present embodiment, the outer clutch plate 124 is an annular plate-like friction member made of, e.g., an iron-based metal, and the inner clutch plate 125 is a friction member formed by an annular plate-like base material 1250 made of, e.g., an iron-based metal and friction materials 1251 bonded to both side surfaces of the base material 1250. For example, the friction material 1251 is made of a paper friction material or nonwoven fabric.

When the first and second friction clutches 12A, 12B are in the deactuated state, there are clearances between the plurality of outer clutch plates 124 and the plurality of inner clutch plates 125, and lubricating oil is introduced into the clearances. The plurality of outer clutch plates 124 and the plurality of inner clutch plates 125 are thus rotatable relative to each other, and transmission of the rotational force via the first and second friction clutches 12A, 12B is cut off.

When the first and second friction clutches 12A, 12B are in the actuated state, the clearances between the plurality of outer clutch plates 124 and the plurality of inner clutch plates 125 are eliminated, and the plurality of outer clutch plates 124 and the plurality of inner clutch plates 125 frictionally contact each other. The lubricating oil introduced between the plurality of outer clutch plates 124 and the plurality of inner clutch plates 125 is discharged via, e.g., oil holes formed in the inner clutch plates 125.

When the first and second friction clutches 12A, 12B are switched from the deactuated state to the actuated state, the pressing member 123 is pressed along the length corresponding to the sum of clearances between the plurality of outer clutch plates 124 and the plurality of inner clutch plates 125. Since the pressing member 123 is subjected to only a small reaction force from the plurality of outer clutch plates 124 and the plurality of inner clutch plates 125 at this time, the electric motor 140 may rotate at a high speed. If the electric motor 140 rotates at a high speed, noise and vibration produced by the rotation of the electric motor 140 tend to be recognized by the driver and the occupant(s).

In the present embodiment, the rotational speed and/or the rotational torque of the electric motor 140 at the time of eliminating the clearances between the plurality of outer clutch plates 124 and the plurality of inner clutch plates 125 are lower when controlled by the third control device 103 than when controlled by the second control device 102. In other words, the motor current that is supplied to the electric motor 140 when controlled by the third control device 103 is smaller than the motor current that is supplied to the electric motor 140 when controlled by the second control device 102. For example, the rotational speed and the rotational torque of the electric motor 140 when controlled by the third control device 103 are half or less of those of the electric motor 140 when controlled by the second control device 102.

How the motor current that is supplied to the electric motor 140, the torque that is transmitted via the first and second friction clutches 12A, 12B, and the rotational speed of the propeller shaft 2 change with time when controlled by the second control device 102 and the third control device 103 will be described with reference to FIGS. 7A and 7B.

Figure 7A:
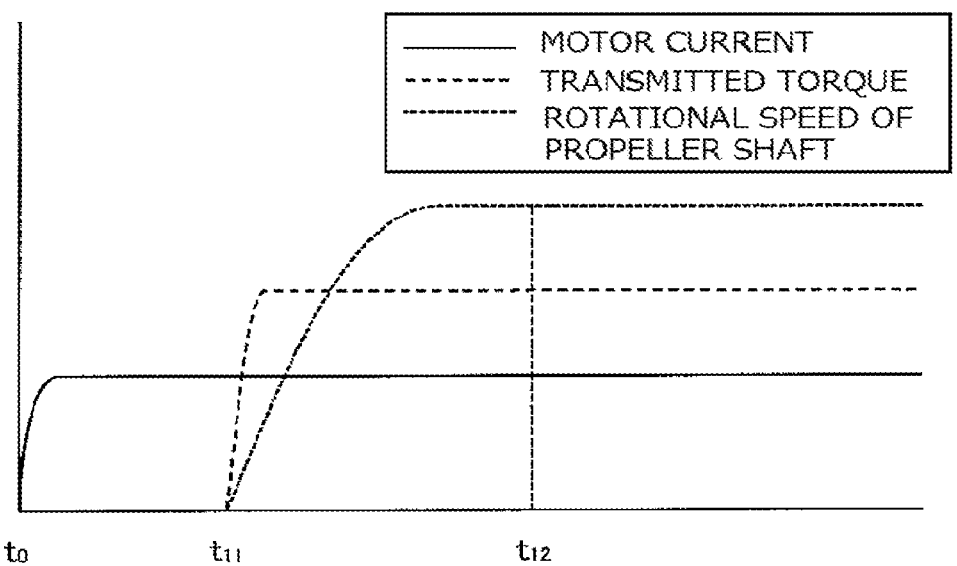
FIG. 7A is a graph showing an example of how the motor current, the transmitted torque, and the rotational speed of a propeller shaft change with time when the four-wheel drive vehicle is switched from a two-wheel drive mode to a four-wheel drive mode based on control by a second control device.
Figure 7B:
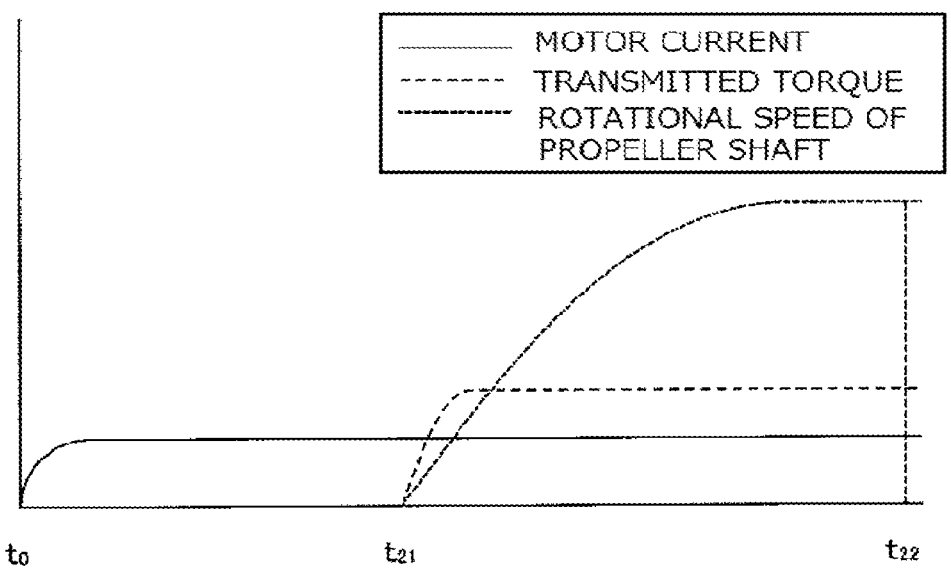
FIG. 7B is a graph showing an example of how the motor current, the transmitted torque, and the rotational speed of the propeller shaft change with time when the four-wheel drive vehicle is switched from the two-wheel drive mode to the four-wheel drive mode based on control by a third control device.

FIGS. 7A and 7B are graphs each showing an example of how the motor current that is supplied to the electric motor 140, the torque that is transmitted via the first and second friction clutches 12A, 12B, and the rotational speed of the propeller shaft 2 change with time when the four-wheel drive vehicle 200 is switched from the two-wheel drive mode to the four-wheel drive mode. FIG. 7A shows how the motor current, the torque, and the rotational speed change with time when controlled by the second control device 102, and FIG. 7B shows how the motor current, the torque, and the rotational speed change with time when controlled by the third control device 103. The scale of the time axis on the abscissa is the same in the graphs of FIGS. 7A and 7B. That is, the time per unit length of the abscissa is the same in FIGS. 7A and 7B. The driving conditions such as the vehicle speed and the road surface condition at the time the four-wheel drive vehicle 200 is switched to the four-wheel drive mode are the same in FIGS. 7A and 7B.

In FIGS. 7A and 7B, t0 represents the time when the control operation of the second control device 102 and the third control device 103 is started, t11 and t21 represent the time the clearances between the plurality of outer clutch plates 124 and the plurality of inner clutch plates 125 are eliminated and the torque that is transmitted via the first and second friction clutches 12A, 12B rises, and t12 and t22 represent the time synchronization of the dog clutch 30 is completed.

A smaller motor current is supplied to the electric motor 140 when controlled by the third control device 103 than when controlled by the second control device 102. The rotational speed of the electric motor 140 is therefore lower when controlled by the third control device 103 than when controlled by the second control device 102. Accordingly, the time required to eliminate the clearances between the plurality of outer clutch plates 124 and the plurality of inner clutch plates 125 is longer when controlled by the third control device 103 than when controlled by the second control device 102. That is, the time period between time t0 and time t21 in the graph of FIG. 7B is longer than that between time t0 and time t11 in the graph of FIG. 7A.

A relatively small motor current is supplied to the electric motor 140 when controlled by the third control device 103. Accordingly, the torque that is transmitted via the first and second friction clutches 12A, 12B is smaller when controlled by the third control device 103 than when controlled by the second control device 102. The rotational speed of the propeller shaft 2 therefore rises more gently and it takes longer to complete synchronization of the dog clutch 30 when controlled by the third control device 103 than when controlled by the second control device 102.

For example, the control device 10 detects completion of synchronization of the dog clutch 30 based on comparison between the detected value of a rotational speed sensor that detects the rotational speed of the propeller shaft 2 and the rotational speed of the front wheels 204R, 204L, and controls the first actuator 300 to cause the plurality of spline teeth 331 of the third rotary member 33 to engage with the recesses 320 of the second rotary member 32. Switching of the four-wheel drive vehicle 200 to the four-wheel drive mode is thus completed.

Functions and effects of the first embodiment will be described. According to the present embodiment, if at least one of the front wheels 204R, 204L has slipped while the four-wheel drive vehicle 200 is traveling in the two-wheel drive mode, the four-wheel drive vehicle 200 can be switched to the four-wheel drive mode by quickly synchronizing the dog clutch 30. Driving stability is thus ensured. If the driver has selected the four-wheel drive mode by a switch operation or if it has been determined that at least one of the front wheels 204R, 204L is likely to slip, the dog clutch 30 is synchronized more slowly than in the case where at least one of the front wheels 204R, 204L has slipped. This can restrain noise and vibration produced by rotation of the electric motor 140 from being recognized by the driver and the occupant(s). That is, this can restrain reduction in driving stability while restraining noise and vibration from being recognized by the driver and the occupant(s).

According to the present embodiment, for example, if the four-wheel drive mode is selected by a switch operation, the electric motor 140 is rotated at a lower speed to eliminate the clearances between the outer clutch plates 124 and the inner clutch plates 125. This can reliably restrain noise and vibration which are produced when the electric motor 140 rotates at a high speed.

According to the present embodiment, the rotational force that is transmitted via the first and second friction clutches 12A, 12B is smaller when controlled by the third control device 103 than when controlled by the second control device 102. Accordingly, when controlled by the third control device 103, the propeller shaft 2 is accelerated more slowly, and noise and vibration that are produced when switching the four-wheel drive vehicle 200 to the four-wheel drive mode are therefore less likely to be recognized.

A second embodiment of the present invention will be described with reference to FIGS. 8 to 10. The present embodiment is different form the first embodiment in the configuration of the driving force transmission system 201 on the rear wheel 205R, 205L side of the four-wheel drive vehicle 200.

FIG. 8 is a diagram schematically showing the configuration of the four-wheel drive vehicle 200 according to the second embodiment.

In FIG. 8, the same members as those described in the first embodiment are denoted with the same reference characters as those of FIG. 1, and description thereof will be omitted.

The four-wheel drive vehicle 200 according to the present embodiment has a rear differential 9 and a driving force transmission device 1B instead of the driving force transmission device 1A of the first embodiment. The rear differential 9 has a differential case 90, a pinion shaft 91, a pair of pinion gears 92, a pair of side gears 93, and a ring gear 94. The pinion shaft 91 rotates together with the differential case 90. The pair of pinion gears 92 are supported by the pinion shaft 91. The pair of side gears 93 mesh with the pair of pinion gears 92 such that the axes of the pair of side gears 93 extend perpendicularly to those of the pair of pinion gears 92. The ring gear 94 is fixed so as to rotate together with the differential case 90. The ring gear 94 meshes with the pinion gear 110 coupled to the propeller shaft 2 such that the axis of the ring gear 94 extends perpendicularly to that of the pinion gear 110.

The first side gear 93 of the pair of side gears 93 is coupled to the axle shaft 207L, and the second side gear 93 of the pair of side gears 93 is coupled to an outer rotary member 53 (described below) that functions as an input shaft of the driving force transmission device 1B. The axle shaft 207R is coupled to the second side gear 93 via the driving force transmission device 1B.

FIG. 9 is a sectional view showing the configuration of the driving force transmission device 1B. In FIG. 9, the part of the outer rotary member 53 which is located above the rotation axis O shows the deactuated state of a friction clutch 5 described below, and the part of the outer rotary member 53 which is located below the rotation axis O shows the actuated state of the friction clutch 5.

The driving force transmission device 1B has the friction clutch 5, a second actuator 6, a housing 7, sealing members 78, 79, and bearings 80 to 89. The friction clutch 5 has a plurality of outer clutch plates 51 and a plurality of inner clutch plates 52. The second actuator 6 applies an axial pressing force to the friction clutch 5. The housing 7 accommodates the friction clutch 5 and the second actuator 6. Lubricating oil, not shown, is enclosed in the housing 7 by using the sealing members 78, 79. The bearings 80 to 89 are provided to allow the parts to rotate smoothly.

The friction clutch 5 receives a pressing force from the second actuator 6, whereby the plurality of outer clutch plates 51 and the plurality of inner clutch plates 52 frictionally contact each other. The second actuator 6 includes an electric motor 61, a reduction gear mechanism 62, a counter gear 63, and a cam mechanism 64. The reduction gear mechanism 62 reduces the speed of rotation output by an output shaft 610 of the electric motor 61. The counter gear 63 transmits output of the reduction gear mechanism 62. The cam mechanism 64 receives the rotational force of the electric motor 61 via the reduction gear mechanism 62 and the counter gear 63 and generates a pressing force that presses the friction clutch 5.

The housing 7 is formed by first to third housing member 71 to 73. The first housing member 71 accommodates the electric motor 61. The second and third housing members 72, 73 accommodate the friction clutch 5, the reduction gear mechanism 62, the counter gear 63, and the cam mechanism 64. The counter gear 63 is supported by a support shaft 74 via the bearing 80. The support shaft 74 is supported between the second housing member 72 and the third housing member 73. Lubricating oil, not shown, is enclosed in the housing 7.

In the present embodiment, the reduction gear mechanism 62 is an involute reduction gear mechanism, and has a rotary shaft member 621, an offset member 622, an input member 623, a rotational force applying member 624, a plurality of shaft-like members 625, and an output member 626. The rotary shaft member 621 rotates together with the output shaft 610 of the electric motor 61. The central axis of the offset member 622 is an axis $O_2$ that is offset from an axis $O_1$ of the rotary shaft member 621 by a predetermined offset amount. The input member 623 is an external gear having a central hole that accommodates the offset member 622. The rotational force applying member 624 is an internal gear whose central axis is the axis $O_1$. The plurality of shaft-like members 625 are accommodated in accommodating holes 624a formed in the rotational force applying member 624 via bearings. The output member 626 receives from the plurality of shaft-like members 625 a rotational force applied from the rotational force applying member 624 to the input member 623 and rotates according to the rotational force. The output member 626 is rotatably supported by the bearings 81, 82 and has a gear portion 626a that meshes with the counter gear 63. The reduction gear mechanism 62 is not limited to the involute reduction gear mechanism, and various types of reduction gear mechanisms can be used as the reduction gear mechanism 62.

The friction clutch 5 transmits a rotational force between the outer rotary member 53 and an inner rotary member 54. The outer rotary member 53 is rotatably supported by the second housing member 72, and the inner rotary member 54 is rotatable relative to the outer rotary member 53 about the same axis as the outer rotary member 53. The outer rotary member 53 has a shaft-like shaft portion 531 and a cylindrical portion 532 having the shape of a bottomed cylinder. The bearings 83, 84 and the sealing member 78 are placed between the outer rotary member 53 and the first housing member 71.

The inner rotary member 54 has a shaft-like boss portion 541 and a cylindrical portion 542 having the shape of a bottomed cylinder. The axis of the boss portion 541 is the rotation axis O. The boss portion 541 and the cylindrical portion 542 are formed as a single-piece member. The boss portion 541 of the inner rotary member 54 is accommodated in a recess 531a formed in the shaft portion 531 of the outer rotary member 53 via the bearing 85. A part of the cylindrical portion 542 which is located on the boss portion 541 side is accommodated in the cylindrical portion 532 of the outer rotary member 53. The bearing 86 is placed between an axial end face on the boss portion 541 side of the cylindrical portion 542 and the outer rotary member 53. The bearing 87 and the sealing member 79 are placed between the opposite end of the cylindrical portion 542 from the boss portion 541 and the third housing member 73.

The friction clutch 5 is placed between the cylindrical portion 532 of the outer rotary member 53 and the cylindrical portion 542 of the inner rotary member 54. The cylindrical portion 532 of the outer rotary member 53 has a straight spline fitting portion 532a formed in its inner peripheral surface, and a plurality of spline projections 511 of the outer clutch plates 51 engage with the straight spline fitting portion 532a. The cylindrical portion 542 of the inner rotary member 54 has a straight spline fitting portion 542a formed in its outer peripheral surface, and a plurality of spline projections 521 of the inner clutch plates 52 engage with the straight spline fitting portion 542a. The outer clutch plates 51 are movable relative to the outer rotary member 53 in the axial direction and are not rotatable relative to the outer rotary member 53. The inner clutch plates 52 are movable relative to the inner rotary member 54 in the axial direction and are not rotatable relative to the inner rotary member 54.

The friction clutch 5 is pressed in the axial direction by an annular pressing member 55, so that the plurality of outer clutch plates 51 and the plurality of inner clutch plates 52 frictionally contact each other. The pressing member 55 has a plurality of spline projections 551 formed in its outer peripheral surface, and the spline projections 551 engage with the straight spline fitting portion 532a of the outer rotary member 53. The pressing member 55 is thus movable relative to the outer rotary member 53 in the axial direction and is not rotatable relative to the outer rotary member 53.

In the outer periphery of the outer rotary member 53, a plurality of (three) guide members 75 for operation of the cam mechanism 64 are placed between the second housing member 72 and the third housing member 73 so as to extend parallel to the rotation axis O. Only one of the guide members 75 is shown in FIG. 3. The guide member 75 has a columnar shape. One axial end of the guide member 75 is fitted in and fixed to a holding hole 72a formed in the second housing member 72. The other axial end of the guide member 75 is fitted in and fixed to a holding hole 73a formed in the third housing member 73. A return spring 76 is fitted on the guide member 75. The return spring 76 is a biasing member that biases a retainer 67 of the cam mechanism 64 in the axial direction. The return spring 76 is a coil spring and is placed in an axially compressed state between the second housing member 72 and the retainer 67. The return spring 76 elastically presses the retainer 67 toward the third housing member 73 side by its restoring force.

Figure 10:
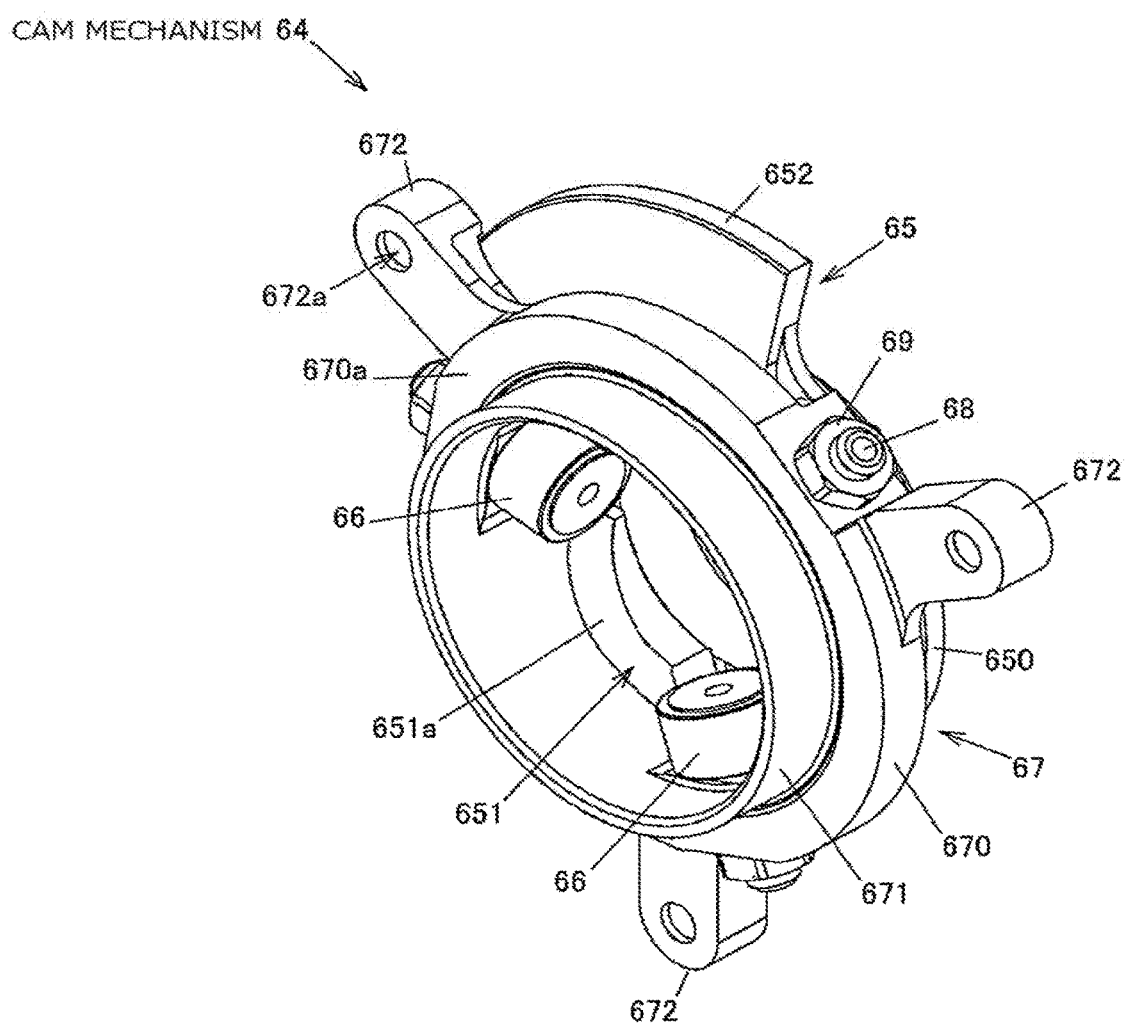
FIG. 10 is a perspective view showing a configuration example of a cam mechanism.

FIG. 10 is a perspective view showing a configuration example of the cam mechanism 64. The cam mechanism 64 functions as a conversion mechanism that converts torque of the electric motor 61 to a pressing force that causes the plurality of outer clutch plates 51 and the plurality of inner clutch plates 52 to frictionally contact each other.

The cam mechanism 64 has a cam member 65, a plurality of (three) rolling members 66, the annular retainer 67, and support pins 68. The cam member 65 has cam surfaces 651a tilted with respect to the rotation axis O. The rolling members 66 roll on the cam surfaces 651a. The retainer 67 outputs thrust generated by the rolling motion of the rolling members 66 toward the friction clutch 5. The support pins 68 support the rolling members 66 so that the rolling members 66 can roll on the cam surface 5a. The retainer 67 is placed closer to the friction clutch 5 than the cam member 65 is. The rolling members 66 are placed inside the retainer 67.

The cam member 65 has an annular shape so that the inner rotary member 54 is inserted therethrough. The cam member 65 has an annular plate-like base portion 650, a plurality of (three) arc-shaped projecting portions 651, and a fan-shaped gear portion 652. The base portion 650 has a predetermined thickness in the direction of the rotation axis O. The projecting portions 651 are formed so as to project from a side surface of the base portion 650 toward the friction clutch 5. The gear portion 652 is formed so as to project outward from a part of the outer peripheral surface of the base portion 650. The base portion 650, the projecting portions 651, and the gear portion 652 are formed as a single-piece member. The bearing 88 (see FIG. 9) is placed between the base portion 650 and the third housing member 73. The bearing 89 (see FIG. 9) is placed between the base portion 650 and the inner rotary member 54.

Each projecting portion 651 of the cam member 65 has the cam surface 651a on which the rolling members 66 roll. The rolling members 66 roll on the cam surfaces 651a to move along the rotation axis O together with the retainer 67. The gear portion 652 has gear teeth formed in its outer peripheral surface so as to mesh with the counter gear 63. The gear teeth are not shown in FIG. 10.

The retainer 67 has an annular plate-like retainer base portion 670, a tubular portion 671 having a cylindrical shape, and a plurality of (three) projecting pieces 672. The base portion 670 has a predetermined thickness in the direction of the rotation axis O. The tubular portion 671 is formed so as to project from an end face on the friction clutch 5 side of the retainer base portion 670. Each projecting piece 672 is formed so as to project outward from a part of the outer peripheral surface of the retainer base portion 670. The base portion 670, the tubular portion 671, and the projecting pieces 672 are formed as a single-piece member.

The retainer base portion 670 has a plurality of (three) pin insertion holes formed in a radial pattern so that the support pins 68 are inserted therethrough. Each support pin 68 is fixed to the retainer 67 by screwing a nut 69 on external threads formed on a portion protruding outward in the radial direction from the retainer base portion 670. Each rolling member 66 is supported by the radially inner end of the support pin 68 via a needle roller bearing 661 (see FIG. 9).

Each projecting piece 672 of the retainer 67 has a guide insertion hole 672a through which the guide member 75 is inserted. Since the guide members 75 are inserted through the guide insertion holes 672a, rotation of the retainer 67 relative to the housing 7 is restricted and the retainer 67 is movable relative to the housing 7 in the axial direction. An opening end face of the guide insertion hole 672a in each projecting piece 672 functions as a receiving surface that receives the pressing force from the return spring 76.

The pressing member 55 and a needle roller bearing 56 (see FIG. 9) are placed on the outer periphery of the tubular portion 671 of the retainer 67. The needle roller bearing 56 is placed between the pressing member 55 and an axial end face 670a of the retainer base portion 670.

When a motor current is supplied from the control device 10 to the electric motor 61 and the output shaft 610 of the electric motor 61 is rotated according to the motor current, the rotation output by the output shaft 610 is reduced in speed by the reduction gear mechanism 62, and the resultant rotation is transmitted to the cam member 65 of the cam mechanism 64 via the counter gear 63. When the cam member 65 is thus rotated, the rolling members 66 roll on the cam surfaces 651a of the projecting portions 651, and the retainer 67 is guided by the guide members 75 to move in the axial direction along the rotation axis O. This moving force in the axial direction is applied to the friction clutch 5 via the needle roller bearing 56 and the pressing member 55 as a pressing force that causes the outer clutch plates 51 and the inner clutch plates 52 to frictionally contact each other.

Like the first and second friction clutches 12A, 12B of the first embodiment, when the friction clutch 5 is in the deactuated state, there are clearances between the plurality of outer clutch plates 51 and the plurality of inner clutch plates 52, and the outer rotary member 53 and the inner rotary member 54 are rotatable relative to each other. When the friction clutch 5 is pressed by the pressing member 55, the clearances between the plurality of outer clutch plates 51 and the plurality of inner clutch plates 52 are eliminated. The plurality of outer clutch plates 51 and the plurality of inner clutch plates 52 thus frictionally contact each other, and the rotational force is transmitted between the outer rotary member 53 and the inner rotary member 54.

When the friction clutch 5 is in the deactuated state, transmission of the driving force from the right side gear 93 of the rear differential 9 in the lateral direction of the vehicle to the axle shaft 207R is cut off. In this state, as the pair of pinion gears 92 rotate, the axle shaft 207L and the outer rotary member 53 rotate in the opposite directions, and the driving force is not transmitted to the axle shaft 207L as well. That is, transmission of the driving force from the propeller shaft 2 to the rear wheels 205R, 205L is cut off by deactuating the friction clutch 5. When the friction clutch 5 is in the actuated state, a driving force equal to that transmitted to the axle shaft 207R is also transmitted to the axle shaft 207L by the driving force transmission device 1B.

The control process that is performed by the control device 10 of the present embodiment is similar to the control process that is performed by the control device 10 of the first embodiment. That is, the control device 10 of the present embodiment also has the first to third control device 101 to 103. The present embodiment therefore has functions and effects similar to those of the first embodiment.

The four-wheel drive vehicle and the control device for the four-wheel drive vehicle according to the present invention are described above based on the first and second embodiments. However, the present invention is not limited to these embodiments. The present invention can be carried out in modified forms without departing from the spirit and scope of the invention.

The first and second embodiments are described with respect to the case where the dog clutch is used as the first clutch capable of cutting off transmission of the driving force from the engine 202 to the propeller shaft 2 and the friction clutch is used as the second clutch capable of cutting off transmission of the driving force from the propeller shaft 2 to the rear wheels 205R, 205L. However, the friction clutch may be used as the first clutch, and the dog clutch may be used as the second clutch. In this case, when the four-wheel drive vehicle is switched from the two-wheel drive mode to the four-wheel drive mode, the dog clutch is actuated after the propeller shaft 2 is rotated by the rotational force transmitted via the friction clutch placed on the front side of the vehicle and synchronization of the dog clutch is completed.

The first and second embodiments are described with respect to the case where the dog clutch in which the projections of the third rotary member engage with the recesses of the first rotary member is actuated after the propeller shaft is rotated by the rotational force transmitted via the friction clutches and synchronization of the dog clutch is completed. However, the present invention is not limited to this. For example, the dog clutch may be a dog clutch including a synchronization mechanism that synchronizes the first rotary member and/or the third rotary member by a frictional rotational force generated by a pressing force of the actuator. In this case, the dog clutch may be actuated simultaneously with the friction clutch.

The first and second embodiments are described with respect to the case where the second actuators 100, 6 are used as the power sources for the electric motors 140, 61. However, the present invention is not limited to this, and a power source other than the electric motor may be used.

The second embodiment is described with respect to the case where driving force transmission device 1B is placed between the rear differential 9 and the axle shaft 207R. However, the present invention is not limited to this. The driving force transmission device 1B may be placed between the rear differential 9 and the axle shaft 207L or between the propeller shaft 2 and the pinion gear 110.

When controlled by the third control device 103, a smaller motor current may be supplied to the electric motor 34 of the first actuator 300 to reduce the rotational speed and/or the rotational torque of the electric motor 34 as compared to when controlled by the second control device 102. This can restrain noise and vibration in the driving force transmission switching device 3 as well when the four-wheel drive vehicle is switched from the two-wheel drive mode to the four-wheel drive mode.

What is claimed is:

1. A control device that is mounted on a four-wheel drive vehicle, in which
the four-wheel drive vehicle in configured to be switched between a two-wheel drive mode and a four-wheel drive mode and includes:
a pair of right and left main drive wheels to which a driving force of a driving source is transmitted in the two-wheel drive mode and the four-wheel drive mode,
a pair of right and left auxiliary drive wheels to which the driving force of the driving source is transmitted in the four-wheel drive mode,
a drive shaft that transmits the driving force to the auxiliary drive wheels,
a first clutch configured to cut off transmission of the driving force from the driving source to the drive shaft,
a second clutch configured to cut off transmission of the driving force from the drive shaft to the auxiliary drive wheels, and
a first actuator that actuates the first clutch,
a second actuator that actuates the second clutch, the second actuator including an electric motor,
the control device controls the first and second actuators, and
the first clutch is a dog clutch that transmits a rotational force when a projection engages with a recess, and the second clutch is a friction clutch that transmits the rotational force when friction members are caused to frictionally contact each other by a pressing force received from the second actuator, the control device comprising:
a first control device that, when the four-wheel drive vehicle is in the two-wheel drive mode in which the driving force is transmitted only to the pair of right and left main drive wheels, cuts off transmission of the rotational force via the dog clutch and the friction clutch to stop rotation of the drive shaft;
a second control device that, when at least one of the pair of right and left main drive wheels slips in the two-wheel drive mode, causes the projection and the recess of the dog clutch to engage with each other after rotating the drive shaft by the rotational force transmitted via the friction clutch to synchronize the dog clutch; and
a third control device that, if a predetermined condition is satisfied when the pair of right and left main drive wheels are not slipping in the two-wheel drive mode, causes the projection and the recess of the dog clutch to engage with each other after rotating the drive shaft by the rotational force transmitted via the friction clutch to synchronize the dog clutch, wherein
time required to synchronize the dog clutch by the third control device is set to be longer than that required to synchronize the dog clutch by the second control device, and
a first electric current that drives the electric motor when controlled by the second control device is greater than a second electric current that drives the electric motor when controlled by the third control device.

2. The control device according to claim 1, wherein the predetermined condition is that a driver has performed an operation to switch the four-wheel drive vehicle from the two-wheel drive mode to the four-wheel drive mode.

3. The control device according to claim 1, wherein the predetermined condition is that it has been determined that at least one of the pair of right and left main drive wheels is likely to slip.

4. The control device according to claim 1, wherein time required to eliminate a clearance between the friction members by the pressing force of the second actuator when controlled by the third control device is set to be longer than that required to eliminate the clearance between the friction members by the pressing force of the second actuator when controlled by the second control device.

5. The control device according to claim 2, wherein time required to eliminate a clearance between the friction members by the pressing force of the second actuator when controlled by the third control device is set to be longer than that required to eliminate the clearance between the friction members by the pressing force of the second actuator when controlled by the second control device.

6. The control device according to claim 3, wherein time required to eliminate a clearance between the friction members by the pressing force of the second actuator when controlled by the third control device is set to be longer than that required to eliminate the clearance between the friction members by the pressing force of the second actuator when controlled by the second control device.

7. The control device according to claim 4, wherein the second actuator includes a conversion mechanism that converts torque of the electric motor to the pressing force that causes the friction members to frictionally contact each other, and
at least one of a rotational speed and rotational torque of the electric motor at the time of eliminating the clearance between the friction members when controlled by the third control device is set to be lower than that of the electric motor at the time of eliminating the clearance between the friction members when controlled by the second control device.

8. The control device according to claim 1, wherein the rotational force that is transmitted via the friction clutch when controlled by the third control device is set to be smaller than the rotational force that is transmitted via the friction clutch when controlled by the second control device.

9. The control device according to claim 2, wherein the rotational force that is transmitted via the friction clutch when controlled by the third control device is set to be smaller than the rotational force that is transmitted via the friction clutch when controlled by the second control device.

10. The control device according to claim 3, wherein the rotational force that is transmitted via the friction clutch when controlled by the third control device is set to be smaller than the rotational force that is transmitted via the friction clutch when controlled by the second control device.

11. The control device according to claim 4, wherein the rotational force that is transmitted via the friction clutch when controlled by the third control device is set to be smaller than the rotational force that is transmitted via the friction clutch when controlled by the second control device.

12. The control device according to claim 7, wherein
the rotational force that is transmitted via the friction clutch when controlled by the third control device is set to be smaller than the rotational force that is transmitted via the friction clutch when controlled by the second control device.

13. A four-wheel drive vehicle comprising the control device of claim 1.

14. The control device according to claim 1, wherein
the electric motor is a first electric motor that drives a hydraulic pump, and
the first actuator includes a second electric motor moves a rotary member that engages the dog clutch.

15. The control device according to claim 14, wherein
the second actuator includes the hydraulic pump, a first control valve, and a second control valve, and
the first and second control valves switch a flow path of hydraulic oil that causes the friction members to frictionally contact.

* * * * *